(12) United States Patent  
Ogawa et al.

(10) Patent No.: US 9,106,355 B2
(45) Date of Patent: Aug. 11, 2015

(54) TRANSMISSION DEVICE, RECEIVING DEVICE, TRANSMISSION METHOD, AND RECEIVING METHOD

(75) Inventors: Yoshihiko Ogawa, Kanagawa (JP); Akihiko Nishio, Osaka (JP); Takashi Iwai, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 75 days.

(21) Appl. No.: 14/001,583

(22) PCT Filed: Mar. 26, 2012

(86) PCT No.: PCT/JP2012/002087
§ 371 (c)(1),
(2), (4) Date: Aug. 26, 2013

(87) PCT Pub. No.: WO2012/147273
PCT Pub. Date: Nov. 1, 2012

(65) Prior Publication Data
US 2013/0329543 A1  Dec. 12, 2013

(30) Foreign Application Priority Data

Apr. 26, 2011  (JP) ................... 2011-098353

(51) Int. Cl.
*H04J 11/00* (2006.01)
*H04J 13/18* (2011.01)
*H04B 7/04* (2006.01)
*H04L 25/02* (2006.01)
(Continued)

(52) U.S. Cl.
CPC .............. *H04J 11/00* (2013.01); *H04B 7/0413* (2013.01); *H04B 7/0671* (2013.01); *H04J 13/18* (2013.01); *H04L 5/0048* (2013.01); *H04L 5/0053* (2013.01); *H04L 25/0224* (2013.01);
(Continued)

(58) Field of Classification Search
CPC ......... H04J 11/00; H04J 13/18; H04W 48/16; H04W 72/00; H04L 5/0007; H04L 5/0048; H04L 25/0224; H04L 5/0037; H04L 5/0053; H04L 27/2613; H04B 7/0413; H04B 7/0671
See application file for complete search history.

(56) References Cited

U.S. PATENT DOCUMENTS 8,638,722 B2* 1/2014 Wang et al. ............ 370/328
2010/0322178 A1* 12/2010 Li et al. .................. 370/329
(Continued)

OTHER PUBLICATIONS

International Search Report for PCT/JP2012/002087 dated Jun. 26, 2012.
(Continued)

*Primary Examiner* — Clemence Han
(74) *Attorney, Agent, or Firm* — Pearne & Gordon LLP

(57) ABSTRACT

A transmission device includes reference signal generator (204) generates a transmission instruction for DMRS or SRS produced by base station (100), and an RS that corresponds to a transmission instruction in the DMRS and SRS on the basis of identification information of an RS pattern used in the DMRS and SRS and set in base station (100). Transmission signal formation unit (207) maps the generated RS to a time frequency resource. The RS pattern of the DMRS and the RS pattern of the SRS have a relationship in which the RS pattern of the SRS is obtained by adding the length of a CS series/4 to the cyclic shift amount, which is an element of the CS series pattern, in the RS pattern of the DMRS, and inverting the identification information of a first Walsh series or a second Walsh series, which are constituent elements of an OCC pattern.

8 Claims, 16 Drawing Sheets

(51) Int. Cl.
*H04B 7/06* (2006.01)
*H04L 27/26* (2006.01)
*H04W 4/00* (2009.01)
*H04W 48/16* (2009.01)
*H04L 5/00* (2006.01)
*H04W 72/00* (2009.01)

(52) U.S. Cl.
CPC .......... *H04L27/2613* (2013.01); *H04L 5/0007* (2013.01); *H04L 5/0037* (2013.01); *H04W 48/16* (2013.01); *H04W 72/00* (2013.01)

(56) References Cited

U.S. PATENT DOCUMENTS

| | | | |
|---|---|---|---|
| 2012/0250608 A1* | 10/2012 | Wang et al. | 370/328 |
| 2012/0269144 A1* | 10/2012 | Suzuki et al. | 370/329 |
| 2013/0016674 A1* | 1/2013 | Xu et al. | 370/329 |
| 2014/0301321 A1* | 10/2014 | Han et al. | 370/329 |

OTHER PUBLICATIONS

Qualcomm Incorporated, UL Transmission mode configuration, 3GPP TSG-RAN WG1#63 R1-106364, Nov. 19, 2010, Internet <URL:http://www.3gpp.org/ ftp/tsg- ran/WG1- RL1/TSGR1-63/Docs/R1-106364. zip>.

Huawei, HiSilicon, Sounding using DMRS, 3GPP TSG-RAN WG1#63 R1-105847, Nov. 15, 2010, Internet <URL:http://www.3gpp.org/ftp/tsg- ran/WG1- RL1/ TSGR1-63/Docs/R1-105847.zip>.

TS36.211 v10.0.0 "3GPP TSG RAN; Evolved Universal Terrestrial Radio Access (E-UTRA); Physical Channels and Modulation", Dec. 2010.

R1-102304, DoCoMo, "Uplink DM-RS Resource Assignment for LTE-Advanced", Apr. 12, 2010.

Qualcomm Incorporated, UL Transmission mode configuration, 3GPP TSG-RAN WG1#63 R1-106364, Nov. 19, 2010, Internet <URL:http://www.3gpp.org/ftp/tsg—ran/WG1—RL1/TSGR1-63/Docs/R1-106364.zip>.

Huawei, HiSilicon, Sounding using DMRS, 3GPP TSG-RAN WG1#63 R1-105847, Nov. 15, 2010, Internet <URL:http://www.3gpp.org/ftpftsg—ran/WG1—RL1/TSGR1-63/Docs/R1-105847.zip>.

* cited by examiner

PRIOR ART

| 3 bits indication | CS NUMBER OF EACH ANTENNA PORT | | | | OCC NUMBER OF EACH ANTENNA PORT | | | |
|---|---|---|---|---|---|---|---|---|
| | 40 | 41 | 42 | 43 | 40 | 41 | 42 | 43 |
| | 20 | 21 | | | 20 | 21 | | |
| 000 | 0 | 6 | 3 | 9 | w1 | w1 | w2 | w2 |
| 100 | 2 | 8 | 5 | 11 | w1 | w1 | w1 | w1 |
| 010 | 3 | 9 | 6 | 0 | w2 | w2 | w1 | w1 |
| 011 | 4 | 10 | 7 | 1 | w1 | w1 | w1 | w1 |
| 001 | 6 | 0 | 9 | 3 | w2 | w2 | w1 | w1 |
| 101 | 8 | 2 | 11 | 5 | w2 | w2 | w2 | w2 |
| 111 | 9 | 3 | 0 | 6 | w1 | w1 | w2 | w2 |
| 110 | 10 | 4 | 1 | 7 | w2 | w2 | w2 | w2 |

FIG. 2

| ANTENNA PORT | 0 | 1 |
|---|---|---|
| DMRS (011) | 4, w1 | 10, w1 |
| SRS (101) | 8, w2 | 2, w2 |

DIFFERENCE OF CYCLIC SHIFT VALUE: 2
DIFFERENT WALSH SEQUENCES

FIG. 5B

| ANTENNA PORT | 0 | 1 |
|---|---|---|
| DMRS (000) | 0, w1 | 6, w1 |
| SRS (010) | 3, w2 | 9, w2 |

DIFFERENCE OF CYCLIC SHIFT VALUE: 3
DIFFERENT WALSH SEQUENCES

FIG. 5A

| ANTENNA PORT | 0 | 1 | 2 | 3 |
|---|---|---|---|---|
| DMRS | 3, w2 | 9, w2 | 6, w1 | 0, w1 |
| SRS | 4, w1 | 10, w1 | 7, w1 | 1, w1 |

SAME WALSH SEQUENCE (ports 2 and 3)

RS PATTERN TABLE OF DMRS

| 3 bits indication | CS NUMBER OF EACH ANTENNA PORT | | | | OCC ARRANGEMENT OF EACH ANTENNA PORT | | | |
|---|---|---|---|---|---|---|---|---|
| | 40 | 41 | 42 | 43 | 40 | 41 | 42 | 43 |
| | 20 | 21 | --- | --- | 20 | 21 | --- | --- |
| 000 | 0 | 6 | 3 | 9 | w1 | w1 | w2 | w2 |
| 100 | 2 | 8 | 5 | 11 | w1 | w1 | w2 | w1 |
| 010 | 3 | 9 | 6 | 0 | w2 | w2 | w1 | w1 |
| 011 | 4 | 10 | 7 | 1 | w1 | w2 | w1 | w1 |
| 001 | 6 | 0 | 9 | 3 | w2 | w2 | w1 | w2 |
| 101 | 8 | 2 | 11 | 5 | w2 | w2 | w2 | w2 |
| 111 | 9 | 3 | 0 | 6 | w1 | w1 | w2 | w2 |
| 110 | 10 | 4 | 1 | 7 | w2 | w2 | w2 | w2 |

FIG. 11B

RS PATTERN TABLE OF SRS

| 3 bits indication | CS NUMBER OF EACH ANTENNA PORT | | | | OCC ARRANGEMENT OF EACH ANTENNA PORT | | | |
|---|---|---|---|---|---|---|---|---|
| | 40 | 41 | 42 | 43 | 40 | 41 | 42 | 43 |
| | 20 | 21 | --- | --- | 20 | 21 | --- | --- |
| 000 | 3 | 9 | 6 | 0 | w1 | w2 | w1 | w1 |
| 100 | 5 | 11 | 8 | 2 | w2 | w2 | w2 | w2 |
| 010 | 6 | 0 | 9 | 3 | w1 | w1 | w2 | w2 |
| 011 | 7 | 1 | 10 | 4 | w2 | w2 | w2 | w2 |
| 001 | 9 | 3 | 0 | 6 | w1 | w1 | w2 | w2 |
| 101 | 11 | 5 | 2 | 8 | w1 | w2 | w1 | w1 |
| 111 | 0 | 6 | 3 | 9 | w2 | w1 | w1 | w1 |
| 110 | 1 | 7 | 4 | 10 | w1 | w1 | w1 | w1 |

RS PATTERN TABLE OF SRS

| 3 bits indication | CS NUMBER OF EACH ANTENNA PORT | | | | OCC ARRANGEMENT OF EACH ANTENNA PORT | | | |
|---|---|---|---|---|---|---|---|---|
| | 40 | 41 | 42 | 43 | 40 | 41 | 42 | 43 |
| 000 | 20 | 21 | — | — | — | — | — | — |
| 100 | 9 | 3 | 0 | 6 | w2 | w2 | w1 | w1 |
| 010 | 11 | 5 | 2 | 8 | w2 | w2 | w2 | w2 |
| 011 | 0 | 6 | 3 | 9 | w1 | w1 | w2 | w2 |
| 001 | 1 | 7 | 4 | 10 | w2 | w2 | w2 | w2 |
| 101 | 3 | 9 | 6 | 0 | w1 | w1 | w2 | w1 |
| 111 | 5 | 11 | 8 | 2 | w2 | w2 | w1 | w1 |
| 110 | 6 | 0 | 9 | 3 | w1 | w1 | w1 | w1 |
| | 7 | 1 | 10 | 4 | w1 | w1 | w1 | w1 |

FIG. 12

| ANTENNA PORT | 0 | 1 | 2 | 3 |
|---|---|---|---|---|
| DMRS (000) | 0, w1 | 6, w1 | 3, w2 | 9, w2 |
| SRS (010) | 9, w1 | 3, w1 | 0, w2 | 6, w2 |

RS PATTERN TABLE OF SRS

| 3 bits indication | CS NUMBER OF EACH ANTENNA PORT | | | | OCC ARRANGEMENT OF EACH ANTENNA PORT | | | |
|---|---|---|---|---|---|---|---|---|
| | 40 | 41 | 42 | 43 | 40 | 41 | 42 | 43 |
| 000 | 20 | 21 | — | — | 20 | 21 | — | — |
| 100 | 9 | 3 | 0 | 6 | w1 | w1 | w1 | w1 |
| 010 | 0 | 6 | 3 | 9 | w2 | w2 | w1 | w1 |
| 011 | 1 | 7 | 4 | 10 | w1 | w1 | w1 | w1 |
| 001 | 3 | 9 | 6 | 0 | w2 | w2 | w1 | w1 |
| 101 | 5 | 11 | 8 | 2 | w2 | w2 | w2 | w2 |
| 111 | 6 | 0 | 9 | 3 | w1 | w1 | w2 | w2 |
| 110 | 7 | 1 | 10 | 4 | w2 | w2 | w2 | w2 |

| | RS PATTERN TABLE OF SRS | | | | | | | |
|---|---|---|---|---|---|---|---|---|
| | CS NUMBER OF EACH ANTENNA PORT | | | | OCC ARRANGEMENT OF EACH ANTENNA PORT | | | |
| 3 bits indication | 40 | 41 | 42 | 43 | 40 | 41 | 42 | 43 |
| | 20 | 21 | — | — | | | | |
| 000 | 3 | 9 | 6 | 0 | w1 | w1 | w2 | — |
| 100 | 5 | 11 | 8 | 2 | w1 | w1 | w1 | w1 |
| 010 | 6 | 0 | 9 | 3 | w2 | w2 | w1 | w1 |
| 011 | 7 | 1 | 10 | 4 | w1 | w1 | w1 | w1 |
| 001 | 9 | 3 | 0 | 6 | w2 | w2 | w1 | w1 |
| 101 | 11 | 5 | 2 | 8 | w1 | w2 | w2 | w2 |
| 111 | 0 | 6 | 3 | 9 | w2 | w1 | w2 | w2 |
| 110 | 1 | 7 | 4 | 10 | w2 | w2 | w2 | w2 |

FIG. 15

FIG. 16A — RS PATTERN TABLE OF DMRS

| 3 bits indication | CS number of each antenna port | | | | OCC arrangement of each antenna port | | | |
|---|---|---|---|---|---|---|---|---|
| | 40 | 41 | 42 | 43 | 40 | 41 | 42 | 43 |
| | 20 | 21 | — | — | 20 | 21 | — | — |
| 000 | 0 | 6 | 3 | 9 | w1 | w1 | w2 | w2 |
| 100 | 2 | 8 | 5 | 11 | w1 | w1 | w1 | w1 |
| 010 | 3 | 9 | 6 | 0 | w2 | w2 | w1 | w1 |
| 011 | 4 | 10 | 7 | 1 | w1 | w1 | w1 | w1 |
| 001 | 6 | 0 | 9 | 3 | w1 | w2 | w1 | w2 |
| 101 | 8 | 2 | 11 | 5 | w2 | w2 | w2 | w2 |
| 111 | 9 | 3 | 0 | 6 | w1 | w1 | w2 | w2 |
| 110 | 10 | 4 | 1 | 7 | w2 | w2 | w2 | w2 |

FIG. 16B — RS PATTERN TABLE OF SRS

| 3 bits indication | CS number of each antenna port | | | | OCC number of each antenna port | | | |
|---|---|---|---|---|---|---|---|---|
| | 40 | 41 | 42 | 43 | 40 | 41 | 42 | 43 |
| | 20 | 21 | — | — | 20 | 21 | — | — |
| 000 | 1 | 7 | 4 | 10 | w2 | w2 | w1 | w1 |
| 100 | 3 | 9 | 6 | 0 | w2 | w2 | w2 | w2 |
| 010 | 4 | 10 | 7 | 1 | w1 | w1 | w2 | w2 |
| 011 | 5 | 11 | 8 | 2 | w2 | w1 | w2 | w2 |
| 001 | 7 | 1 | 10 | 4 | w1 | w1 | w2 | w2 |
| 101 | 9 | 3 | 0 | 6 | w2 | w1 | w1 | w1 |
| 111 | 10 | 4 | 1 | 7 | w1 | w2 | w1 | w1 |
| 110 | 11 | 5 | 2 | 8 | w1 | w1 | w1 | w1 |

FIG. 17

RS PATTERN TABLE OF SRS

| 3 bits indication | CS NUMBER OF EACH ANTENNA PORT | | | | OCC ARRANGEMENT OF EACH ANTENNA PORT | | | |
|---|---|---|---|---|---|---|---|---|
| | 40 / 20 | 41 / 21 | 42 | 43 | 40 / 20 | 41 / 21 | 42 | 43 |
| 000 | 7 | 1 | 10 | 4 | w1 | w1 | w2 | w2 |
| 100 | 9 | 3 | 0 | 6 | w1 | w1 | w1 | w1 |
| 010 | 10 | 4 | 1 | 7 | w2 | w2 | w1 | w1 |
| 011 | 11 | 5 | 2 | 8 | w1 | w1 | w1 | w1 |
| 001 | 1 | 7 | 4 | 10 | w2 | w2 | w1 | w1 |
| 101 | 3 | 9 | 6 | 0 | w2 | w2 | w2 | w2 |
| 111 | 4 | 10 | 7 | 1 | w1 | w1 | w2 | w2 |
| 110 | 5 | 11 | 8 | 2 | w2 | w2 | w2 | w2 |

TRANSMISSION DEVICE, RECEIVING DEVICE, TRANSMISSION METHOD, AND RECEIVING METHOD

TECHNICAL FIELD

The present invention relates to a transmitting apparatus, a receiving apparatus, a transmission method, and a reception method.

BACKGROUND ART

The release 10 (Rel.10) standard in 3GPP LTE-Advanced (3rd generation partnership project long-term evolution-advanced, hereinafter simply referred to as "LTE-A") uses SU-MIMO (single user-multi input multi output) using up to four antenna ports in uplink data transmission. The system throughput can thereby be improved. A demodulation reference signal (DMRS) is also transmitted in the uplink. A cyclic shift sequence (CS sequence) which is an orthogonal sequence and a Walsh sequence (orthogonal cover code, OCC) are used as the demodulation reference signal (see FIG. 1). Inter-sequence interference can be reduced in this way. Here, a terminal generates a transmission sequence used by the terminal by applying to a basic sequence, a cyclic shift corresponding to one of cyclic shift values 0 to 7 (that is, indicated with 3 bits) reported from a base station. A cyclic shift value is represented by "cyclic shift (CS) number "0 to 11"×symbol length/12." In this way, orthogonality among cyclic shift sequences can be secured. As OCC, two OCCs: w1=[1 1] and w2=[1 −1] having orthogonality are provided. Two pilot signals located in one subframe are multiplied by w1=[1 1] or w2=[1 −1]. A Zadoff-Chu sequence is used as a basic sequence in the LTE standard.

FIG. 2 shows a table of demodulation reference signals defined in the Rel.10 standard. In FIG. 2, four antenna port identification numbers, cyclic shift values and identification information of a Walsh sequence (that is, w1 or w2) corresponding to each antenna port identification number are associated with each other regarding each of eight demodulation reference signal candidates. When the base station assigns demodulation reference signal candidates to a terminal, the base station indicates identification information of the demodulation reference signal candidate (3 bits) to an assignment target terminal via a PDCCH (physical downlink control channel) (see Non-Patent Literature 1).

In FIG. 2, antenna ports 40, 41, 42 and 43 mean antenna ports #0, #1, #2 and #3 when four antenna ports are used. Antenna ports 20 and 21 mean antenna ports #0 and #1 when two antenna ports are used. Although antenna port 10 is not shown in FIG. 2, antenna port 10 is located on the same column on which antenna ports 40 and 20 are located.

As is obvious from FIG. 2, an offset pattern (hereinafter simply referred to as "offset pattern") regarding offset values of cyclic shift values with respect to a second antenna port (#1), a third antenna port (#2) and a fourth antenna port (#3) from a cyclic shift amount corresponding to a first antenna port (#0) is fixed. That is, in the case of four antenna ports (that is, in the case of 4-antenna MIMO transmission), the offset pattern is "0, 6, 3, 9." That is, CS intervals among antenna ports are designed to be maximum in both cases of 2-antenna MIMO and 4-antenna MIMO. For example, when the number of antenna ports used for DMRS transmission is 2, the amount of offset of CS numbers is "0, 6" and the CS interval becomes a "symbol length/2." On the other hand, when the number of antenna ports used for DMRS transmission is 4, the amount of offset of CS numbers is "0, 6, 3, 9" and the CS interval becomes a "symbol length/4."

According to the Rel.10 standard, when the number of antenna ports used for DMRS transmission is 2, DMRS is orthogonalized by only a CS sequence. For example, for one DMRS, OCC numbers are common to two antenna ports and only one of w1 and w2 is applied. Furthermore, according to the Rel.10 standard, when the number of antenna ports is three or more, OCCs differing from one antenna port to another may be applied for one DMRS. This is because, when the number of antenna ports used for DMRS transmission is two, only the CS sequence is sufficient, whereas when the number of antenna ports used for DMRS transmission is three or more, the CS interval cannot always be said to be sufficient for orthogonalization by only the CS sequence. For this reason, when the number of antenna ports used for DMRS transmission is three or more, orthogonality is improved through orthogonalization by OCC in addition to the CS sequence (see Non-Patent Literature 3). In FIG. 2, for half of the demodulation reference signal candidate group (3-bit indication is '000', '010', '001' and '111'), OCC identification information is common regarding antenna ports #0 and #1, and OCC identification information differs regarding antenna ports #2 and #3. For the remaining half (3-bit indication is '100', '011', '101' and '110'), OCC identification information is common to all antenna ports #0, #1, #2 and #3.

As described above, a pair of a "CS pattern candidate" and an "OCC pattern candidate" are associated with each of eight RS pattern candidates in the DMRS reference signal (RS) pattern table shown in FIG. 2. The term "CS pattern candidate" is defined by four antenna port identification numbers and a cyclic shift value (or CS number) corresponding to each antenna port identification number. On the other hand, the "OCC pattern candidate" is defined by four antenna port identification numbers and identification information of a Walsh sequence corresponding to each antenna port identification number (that is, w1 or w2).

Furthermore, according to the Rel.10 standard, SRS (sounding RS) which is a receiving quality measuring reference signal is transmitted in uplink. This SRS is time-division multiplexed (TDM) with a symbol different from DMRS. More specifically, a DMRS is mapped to the fourth and eleventh symbols and an SRS is mapped to the fourteenth symbol (see FIG. 3). Note that a DMRS and SRS are mapped independently of each other. Furthermore, DMRSs and SRSs of a plurality of terminals are assigned to the same frequency.

As described above, DMRSs are used to demodulate data signals. A terminal which is on the data signal transmitting side transmits a DMRS from an antenna port from which a data signal is transmitted in a subframe where the data signal is transmitted. On the other hand, SRSs are used to acquire receiving quality information used for frequency scheduling. Therefore, since SRS transmission has a low correlation with data signal transmission, SRSs are generally transmitted independently of other signals. Furthermore, in an LTE uplink, a bandwidth in which a demodulation reference signal is transmitted is identical to a bandwidth of a data signal, whereas a bandwidth in which a receiving quality reference signal is transmitted is not dependent on the bandwidth of the data signal.

According to the LTE-A Rel.11 standard, an expansion of SRS resources is planned in preparation for shortage of resources used for SRS transmission (hereinafter, may also be referred to as "SRS resources") as the number of terminals that perform MIMO communication increases. A candidate for such a method is a method of code-multiplexing an SRS (e.g., for UE#1) with a DMRS (e.g., for UE#2) as shown in FIG. 4 (see Non-Patent Literature 2). According to the technique disclosed in Non-Patent Literature 2, an SRS is configured in the same way as for a DMRS (e.g., sequence group) except that trigger information used for timing control of SRS transmission is indicated by a base station to a terminal via a PDCCH. That is, when transmission of an SRS to be code-multiplexed with a DMRS is triggered, an SRS is generated according to the table described in FIG. 2 as with DMRS. Examples of the method of triggering SRS transmission include a method of changing an instruction (e.g., constellation) which is less likely to be used during normal operation to trigger information and a method of newly providing a trigger bit or the like.

CITATION LIST

Non-Patent Literature

NPL 1
TS36.211 v10.0.0"3GPP TSG RAN; Evolved Universal Terrestrial Radio Access (E-UTRA); Physical Channels and Modulation"
NPL 2
R1-105847, Huawei, HiSilicon, "Sounding using DMRS," 3GPP TSG RAN WG1 meeting #63
NPL 3
R1-102304, DoCoMo, "Uplink DM-RS Resource Assignment for LTE-Advanced"

SUMMARY OF INVENTION

Technical Problem

However, when the same table (e.g., table used in FIG. 2) is used for both assignment of DMRS and assignment of SRS, there is a problem that the degree of freedom regarding assignment of DMRS and SRS is low.

An object of the present invention is to provide a transmitting apparatus, a receiving apparatus, a transmission method and a reception method each of which makes it possible to prevent a reduction in the degree of freedom regarding assignment of a demodulation reference signal and a receiving quality reference signal even when the demodulation reference signal and the receiving quality reference signal are transmitted using an identical time-frequency resource.

Solution to Problem

A transmitting apparatus according to an aspect of the present invention is a transmitting apparatus configured to transmit, to a receiving apparatus, using a plurality of antenna ports, at least one of a first reference signal used in the receiving apparatus to demodulate received data and a second reference signal used in the receiving apparatus to measure receiving quality, the transmitting apparatus including: a generating section that generates at least one of the first reference signal and the second reference signal based on identification information of a reference signal pattern used for the first reference signal and the second reference signal; and a transmitting section that transmits at least one of the generated first reference signal and second reference signal, in which: the reference signal pattern includes a first pattern and a second pattern; the first pattern includes pieces of identification information of the plurality of antenna ports and cyclic shift values given to cyclic shift sequences respectively corresponding to the pieces of identification information; the second pattern includes the pieces of identification information of the plurality of antenna ports and identification information of a first Walsh sequence or a second Walsh sequence corresponding to each of the pieces of identification information; and the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift value and inverting the identification information of the first Walsh sequence or the second Walsh sequence, the cyclic shift value being a component of the first pattern in the reference signal pattern of the first reference signal, the identification information of the first Walsh sequence or the second Walsh sequence being a component of the second pattern in the reference signal pattern of the first reference signal.

A receiving apparatus according to an aspect of the present invention is a receiving apparatus configured to receive a first reference signal used to demodulate received data and a second reference signal used to measure receiving quality, using a plurality of antenna ports, the first and second reference signals being transmitted from a plurality of transmitting apparatuses, the receiving apparatus including: a configuration section that configures a reference signal pattern used for the first reference signal and the second reference signal; and a reception processing section that extracts at least one of the first reference signal and the second reference signal based on identification information of the configured reference signal pattern, in which: the reference signal pattern includes a first pattern and a second pattern; the first pattern includes pieces of identification information of the plurality of antenna ports and cyclic shift values given to cyclic shift sequences respectively corresponding to the pieces of identification information; the second pattern includes the pieces of identification information of the plurality of antenna ports and identification information of a first Walsh sequence or a second Walsh sequence corresponding to each of the pieces of identification information; and the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift value and inverting the identification information of the first Walsh sequence or the second Walsh sequence, the cyclic shift value being a component of the first pattern in the reference signal pattern of the first reference signal, the identification information of the first Walsh sequence or the second Walsh sequence being a component of the second pattern in the reference signal pattern of the first reference signal.

A transmission method according to an aspect of the present invention is a transmission method for transmitting, to a receiving apparatus, using a plurality of antenna ports, at least one of a first reference signal used in the receiving apparatus to demodulate received data and a second reference signal used in the receiving apparatus to measure receiving quality, the transmitting method including: generating at least one of the first reference signal and the second reference signal based on identification information of a reference signal pattern used for the first reference signal and the second reference signal; and transmitting at least one of the generated first reference signal and second reference signal, in which: the reference signal pattern includes a first pattern and a second pattern; the first pattern includes pieces of identification information of the plurality of antenna ports and cyclic shift values given to cyclic shift sequences respectively corresponding to the pieces of identification information; the second pattern includes the pieces of identification information of the plurality of antenna ports and identification information of a first Walsh sequence or a second Walsh sequence corresponding to each of the pieces of identification information; and the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift value and inverting the identification information of the first Walsh sequence or the second Walsh sequence, the cyclic shift value being a component of the first pattern in the reference signal pattern of the first reference signal, the identification information of the first Walsh sequence or the second Walsh sequence being a component of the second pattern in the reference signal pattern of the first reference signal.

A reception method according to an aspect of the present invention is a reception method for receiving, using a plurality of antenna ports, at least one of a first reference signal used to demodulate received data and a second reference signal used to measure receiving quality, the first and second reference signals being transmitted from a plurality of transmitting apparatuses, the reception method including: configuring a reference signal pattern used for the first reference signal and the second reference signal; and extracting at least one of the first reference signal and the second reference signal based on identification information of the configured reference signal pattern, in which: the reference signal pattern includes a first pattern and a second pattern; the first pattern includes pieces of identification information of the plurality of antenna ports and cyclic shift values given to cyclic shift sequences respectively corresponding to the pieces of identification information; the second pattern includes the pieces of identification information of the plurality of antenna ports and identification information of a first Walsh sequence or a second Walsh sequence corresponding to each of the pieces of identification information; and the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift value and inverting the identification information of the first Walsh sequence or the second Walsh sequence, the cyclic shift value being a component of the first pattern in the reference signal pattern of the first reference signal, the identification information of the first Walsh sequence or the second Walsh sequence being a component of the second pattern in the reference signal pattern of the first reference signal.

Advantageous Effects of Invention

According to the present invention, it is possible to provide a transmitting apparatus, a receiving apparatus, a transmission method and a reception method that can prevent a reduction in the degree of freedom regarding assignment of a demodulation reference signal and a receiving quality reference signal even when the demodulation reference signal and receiving quality reference signal are transmitted using an identical time-frequency resource.

BRIEF DESCRIPTION OF DRAWINGS

FIG. 2 is a diagram illustrating a table of demodulation reference signals defined in the Rel.10 standard;

FIGS. 5A and B are diagrams provided for describing a pattern of demodulation reference signals and a pattern of receiving quality measuring reference signals;

FIG. 6 is a diagram provided for describing a pattern of demodulation reference signals and a pattern of receiving quality measuring reference signals;

FIGS. 11A and B are diagrams illustrating a pattern table of demodulation reference signals and a pattern table of receiving quality measuring reference signals;

FIG. 12 is a diagram illustrating a variation of the pattern table of receiving quality measuring reference signals;

FIG. 13 is a diagram provided for describing effects of the pattern table of demodulation reference signals and the pattern table of receiving quality measuring reference signals;

FIG. 14 is a diagram illustrating a pattern table of receiving quality measuring reference signals;

FIG. 15 is a diagram illustrating a pattern table of receiving quality measuring reference signals;

FIGS. 16A and B are diagrams illustrating a pattern table of demodulation reference signals and a pattern table of receiving quality measuring reference signals according to Embodiment 2 of the present invention; and FIG. 17 is a diagram illustrating a variation of the pattern table of receiving quality measuring reference signals.

DESCRIPTION OF EMBODIMENTS

Figure 1:
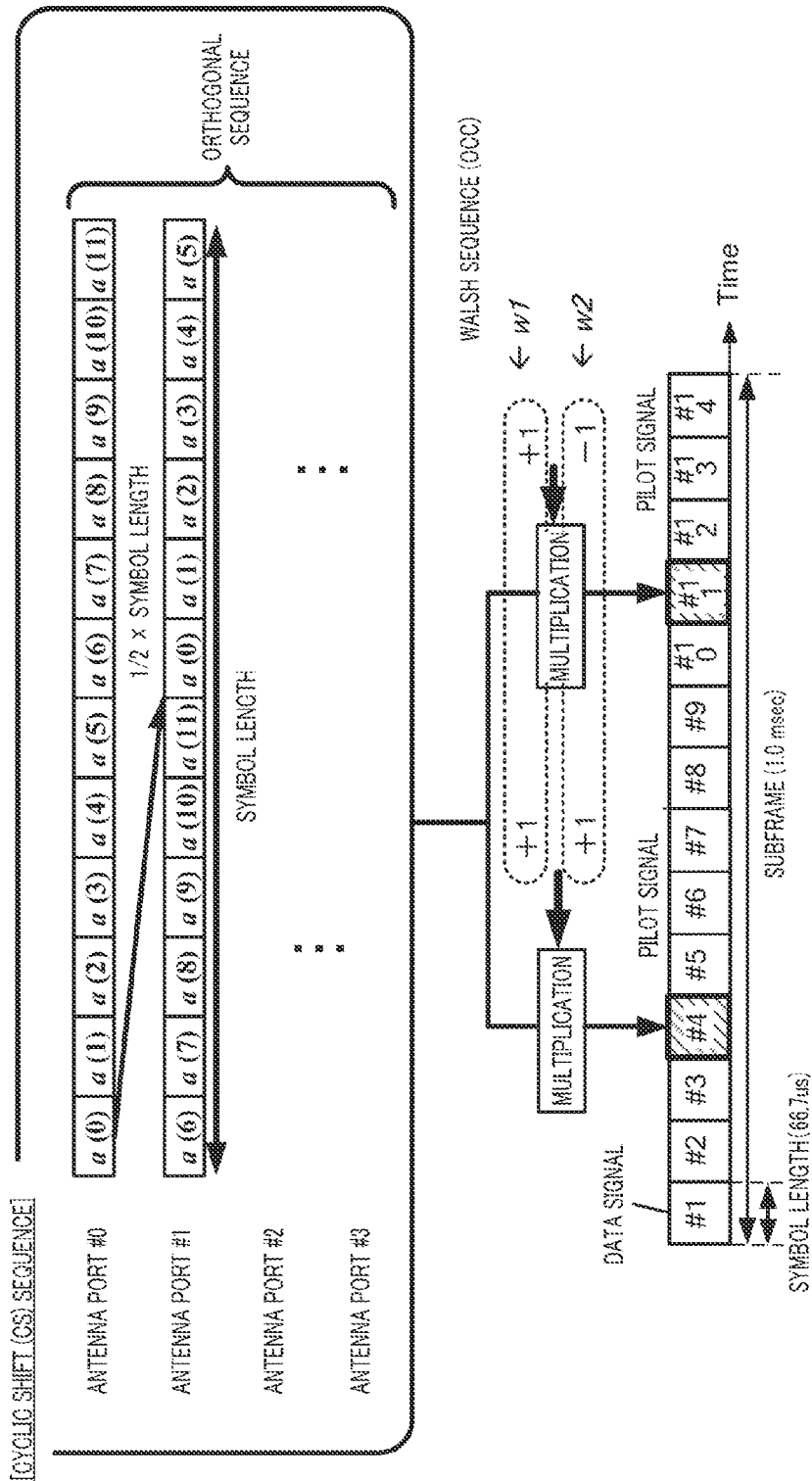
FIG. 1 is a diagram provided for describing a demodulation reference signal.
Figure 3:
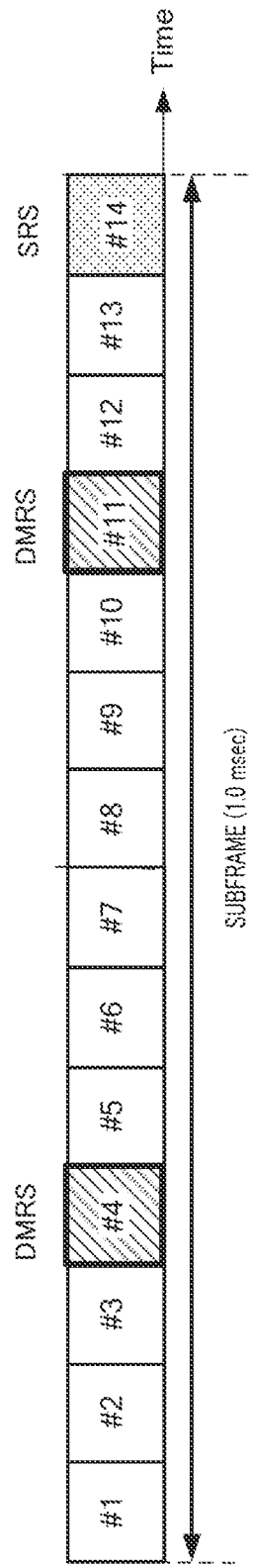
FIG. 3 is a diagram provided for describing transmission of a receiving quality measuring reference signal according to the Rel.10 standard.

The present inventor et al. has first discovered the following first group of problems.

Since it is often the case that each terminal has two or fewer transmitting antennas at an initial stage of a service supporting the Rel.11 standard, the frequency with which a DMRS and SRS are transmitted using two antenna ports each is believed to be high.

When a DMRS and SRS are transmitted using two antenna ports each (that is, the total number of antenna ports is 4), an RS pattern of DMRS and an RS pattern of SRS may have the following relationship so as to minimize inter-sequence interference. That is, the difference in the CS value between CS sequences making up a CS pattern of DMRS and a CS pattern of SRS is assumed to be a "symbol length/4." This maximizes the CS value between CS sequences making up the CS pattern of DMRS and the CS pattern of SRS. Furthermore, for a pair of CS sequences having similar CS values in CS sequences that make up the CS pattern of DMRS and the CS pattern of SRS, different OCC sequences are assigned as OCC sequences corresponding to the pair of CS sequences. As described above, inter-sequences interference of a DMRS and SRS can be minimized. According to the Rel.10 standard, the same table is used for cases where the number of antenna ports used to transmit a reference signal is 3 and 4. Thus, even when the number of antenna ports used to transmit a reference signal is 3 (e.g., when one antenna port is used to transmit one of DMRS and SRS, and two antenna ports are used to transmit the other), a DMRS and SRS are used which are defined by the RS pattern of DMRS and the RS pattern of SRS that satisfy the above-described relationship. Three of four CS numbers and OCC numbers are used which define the RS pattern of DMRS and the RS pattern of SRS. Thus, even when the number of antenna ports used to transmit reference signals is 3, inter-sequence interference of DMRS and SRS can be minimized.

However, when the table shown in FIG. 2 is used as the RS pattern table, in order to satisfy the above-described relationship, it is necessary to select an RS pattern of DMRS and an RS pattern of SRS from among four RS pattern candidates having identification information of "000, 010, 001, 111" (FIG. 5A shows an example where "000" and "010" are selected from identification information "000, 010, 001, 111"). Thus, a decrease in the number of options of the RS pattern of DMRS and the RS pattern of SRS results in a problem in that the number of options of PHICH (physical hybrid ARQ indicator channel) resources dependent on the CS numbers forming the RS pattern of DMRS decreases and a problem in that the effect of reducing inter-cell interference of DMRS and SRS decreases. On the other hand, when an RS pattern of DMRS and an RS pattern of SRS are selected from patterns other than the above-described four patterns, a set of the RS pattern of DMRS and the RS pattern of SRS whose interval of the amount of CS becomes a "symbol length/6 (that is, 2×symbol length/12)" may be selected. In this case, there is a problem in that inter-sequence interference increases (FIG. 5B shows an example where "011, 101" is selected from identification information other than "000, 010, 001, 111"). When the number of antenna ports for transmitting a DMRS and SRS is 2, orthogonality can be sufficiently secured using only CS.

Furthermore, the present inventor et al. has discovered a second problem.

The Rel.10 standard assumes a maximum of four antenna ports to be used for SU-MIMO. That is, a DMRS and SRS may be transmitted using four antenna ports each. As the number of antenna ports used to transmit a DMRS and SRS increases, orthogonality of a CS sequence is lost. For this reason, the effect of improving orthogonality by an OCC sequence increases.

When a DMRS and SRS are transmitted using four antenna ports each (that is, the total number of antenna ports is 8), for example, the RS pattern of DMRS and the RS pattern of SRS may have the following relationship. That is, the difference in the CS value between CS sequences forming the CS pattern of DMRS and the CS pattern of SRS is assumed to be a "symbol length/4." In this case, the CS sequence group forming the CS pattern of DMRS and the CS pattern of SRS includes a plurality of CS sequences corresponding to neighboring CS numbers. More specifically, a case where the CS pattern of DMRS is "3, 9, 6, 0" and the CS pattern of SRS is "4, 10, 7, 1" corresponds to this case (see FIG. 6). At this time, an OCC pattern corresponding to the CS pattern of DMRS is "w2, w2, w1, w1" and an OCC pattern corresponding to the CS pattern of SRS is "w1, w1, w1, w1." Therefore, the CS pattern of DMRS and the CS pattern of SRS include neighboring CS numbers "6, 7" and "0, 1" and OCC numbers corresponding to them are "w1, w1" and "w1, w1." That is, the same OCC is used, which results in an increase of inter-sequence interference. The problem is that the RS patterns that can avoid such inter-sequence interference are limited.

In order to solve the above-described problems, the present inventor et al. has made the present invention. The embodiment to solve the above-described first group of problems mainly corresponds to Embodiment 1. On the other hand, the embodiment to solve the above-described second problem mainly corresponds to Embodiment 2.

Hereinafter, embodiments of the present invention will be described in detail with reference to the accompanying drawings. In the embodiments, the same elements will be assigned the same reference numerals, and any duplicate description of the elements is omitted.

Embodiment 1

Overview of Communication System

A communication system according to Embodiment 1 of the present invention includes base station 100 and terminal 200. Base station 100 is an LTE-A base station and terminal 200 is an LTE-A terminal. Base station 100 receives a first reference signal (e.g., DMRS) transmitted from a plurality of terminals 200 and used to demodulate received data in base station 100 and a second reference signal (e.g., SRS) used to measure receiving quality in base station 100 using a plurality of antenna ports. Furthermore, terminal 200 transmits at least one of the first reference signal and the second reference signal to base station 100 using a plurality of antenna ports.

Figure 7:
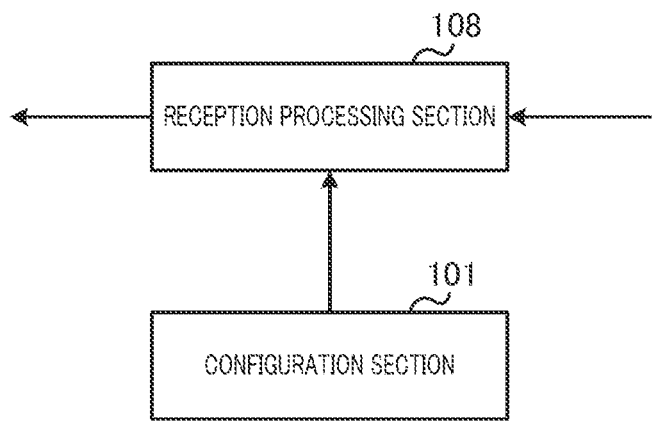
FIG. 7 is a main configuration diagram of a base station according to Embodiment 1 of the present invention.

FIG. 7 is a main configuration diagram of base station 100 according to Embodiment 1 of the present invention. In base station 100, configuration section 101 configures a reference signal pattern used for the first reference signal and the second reference signal. Reception processing section 108 extracts at least one of the first reference signal and the second reference signal based on identification information of the configured reference signal pattern.

The reference signal pattern is formed of a first pattern and a second pattern. The first pattern is formed of respective pieces of identification information of the plurality of antenna ports and cyclic shift values given to cyclic shift sequences corresponding to the respective pieces of identification information. The second pattern is formed of respective pieces of identification information of the plurality of antenna ports and identification information of a first Walsh sequence or a second Walsh sequence corresponding to the respective pieces of identification information.

The reference signal pattern of the first reference signal and the reference signal pattern of the second reference signal have a relationship in which the reference signal pattern of the second reference signal is obtained by adding a length corresponding to the sequence length of the cyclic shift sequence/4 to the cyclic shift value which is a component of the first pattern in the reference signal pattern of the first reference signal and inverting the identification information of the first Walsh sequence or the second Walsh sequence which is a component of the second pattern.

Figure 8:
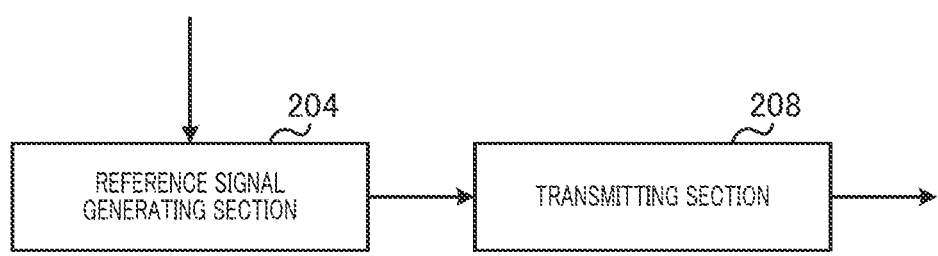
FIG. 8 is a main configuration diagram of a terminal according to Embodiment 1 of the present invention.

FIG. 8 is a main configuration diagram of terminal 200 according to Embodiment 1 of the present invention. In terminal 200, reference signal generating section 204 generates at least one of the first reference signal and the second reference signal based on identification information of a reference signal pattern used for the first reference signal and the second reference signal. Transmitting section 208 transmits at least one of the generated first reference signal and second reference signal.

The reference signal pattern is formed of the first pattern and the second pattern. The first pattern is formed of respective pieces of identification information of the plurality of antenna ports and cyclic shift values given to the cyclic shift sequences corresponding to the respective pieces of identification information. The second pattern is formed of the respective pieces of identification information of the plurality of antenna ports and identification information of the first Walsh sequence or the second Walsh sequence corresponding to the respective pieces of identification information.

The reference signal pattern of the first reference signal and the reference signal pattern of the second reference signal have a relationship in which the reference signal pattern of the second reference signal is obtained by adding a length corresponding to the sequence length of the cyclic shift sequence/4 to the cyclic shift value which is a component of the first pattern in the reference signal pattern of the first reference signal and inverting the identification information of the first Walsh sequence or the second Walsh sequence which is a component of the second pattern.

[Configuration of Base Station 100]

Figure 9:
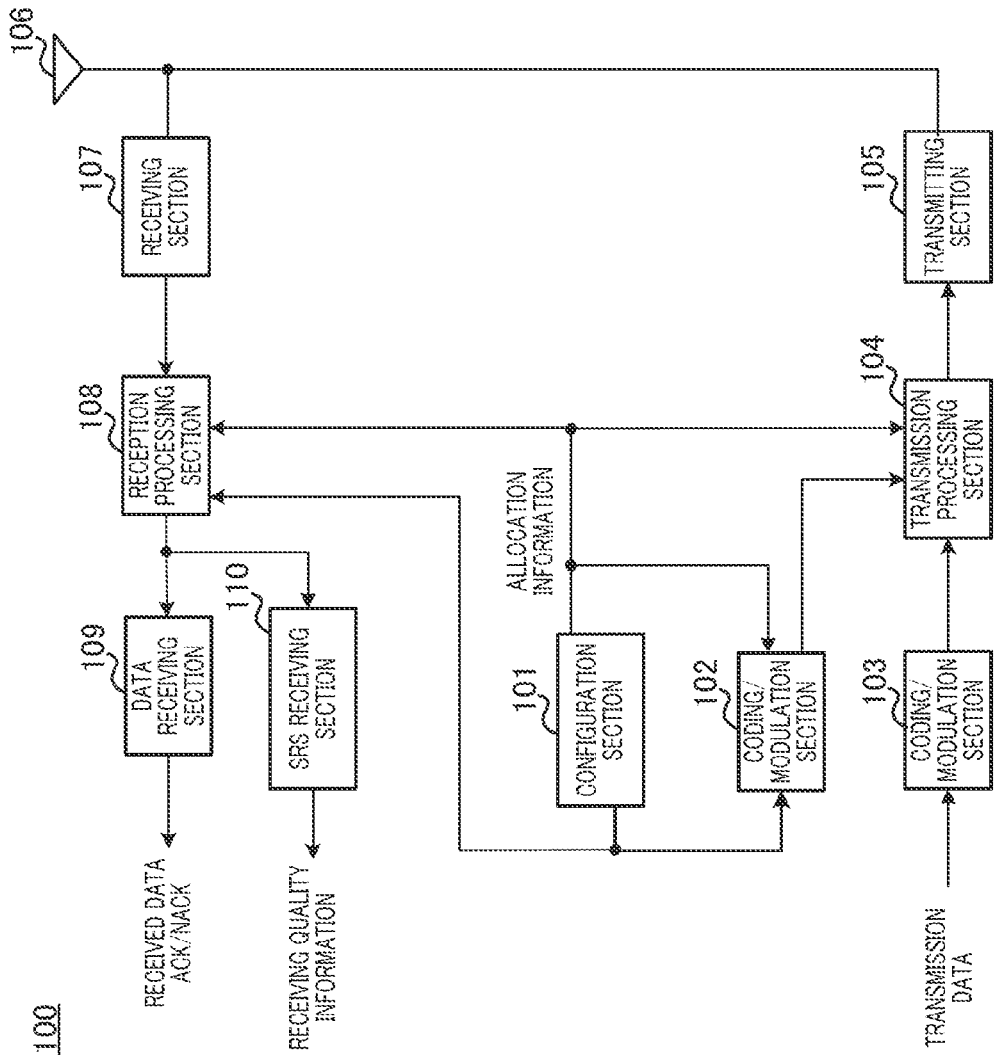
FIG. 9 is a block diagram illustrating a configuration of the base station according to Embodiment 1 of the present invention.

FIG. 9 is a block diagram illustrating a configuration of base station 100 according to Embodiment 1 of the present invention. In FIG. 9, base station 100 includes configuration section 101, coding/modulation sections 102 and 103, transmission processing section 104, transmitting section 105, antenna 106, receiving section 107, reception processing section 108, data receiving section 109, and SRS receiving section 110.

Figure 4:
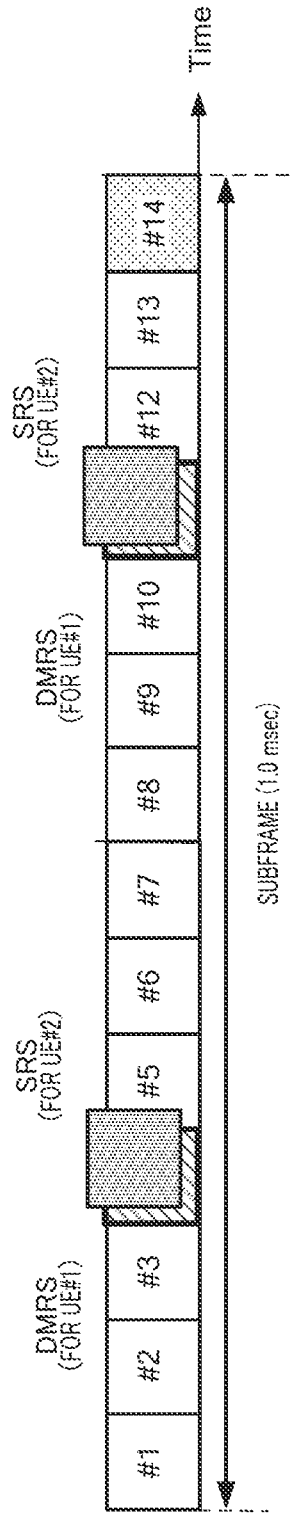
FIG. 4 is a diagram provided for describing a method of expanding resources for receiving quality measuring reference signals.

Configuration section 101 generates "candidate resource configuration information" to configure "candidate resources" of configuration-target terminal 200. More specifically, in addition to a time-frequency resource (#14 in FIG. 4) to which an SRS can be assigned instead of data, configuration section 101 configures resources for SRS transmission by first terminal 200 in the same resource as the time-frequency resource assigned for DMRS transmission by first terminal 200. This candidate resource is a resource to which configuration-target terminal 200 can map an SRS. The candidate resource configuration information can be divided into "time-frequency resource configuration information" and "code resource configuration information." The time-frequency resource configuration information contains a first subframe and a first frequency band from which configuration-target terminal 200 starts configuring candidate resources, and a frequency bandwidth or the like available for configuration-target terminal 200. Furthermore, the above-described RS pattern identification information (3-bit indicator) is used for the code resource configuration information.

Furthermore, configuration section 101 generates trigger information for instructing configuration-target terminal 200 to transmit an SRS. Based on this trigger information, configuration-target terminal 200 determines to transmit an SRS or transmit a DMRS, then, maps the SRS or DMRS to a resource based on the candidate resource configuration information and transmits the resource. The time resource configuration information may be included in the trigger information and indicated.

The candidate resource configuration information generated by configuration section 101 as described above is transmitted to configuration-target terminal 200 as configuration information via coding/modulation section 102, transmission processing section 104 and transmitting section 105. Furthermore, the trigger information is likewise transmitted to configuration-target terminal 200 via coding/modulation section 102, transmission processing section 104 and transmitting section 105. Furthermore, the configuration information and the trigger information are also outputted to reception processing section 108.

Furthermore, configuration section 101 configures information on resource allocation of uplink resources to which uplink data is assigned (e.g., PUSCH (physical uplink shared channel)) and downlink resources to which downlink data is allocated (e.g., PDSCH (physical downlink shared channel)) (hereinafter, simply referred to as "allocation information") and parameters relating to control of MCS or the like (hereinafter, simply referred to as "control information"). Here, the control information on the uplink also includes information on a demodulation reference signal (that is, 3-bit indicator indicating an RS pattern of DMRS). The allocation information on uplink resources is outputted to coding/modulation section 102 and reception processing section 108 and the allocation information on downlink resources is outputted to coding/modulation section 102 and transmission processing section 104.

When a DMRS and SRS are transmitted simultaneously at once, the DMRS and SRS are transmitted from different terminals 200. Therefore, configuration information on DMRS and configuration information on SRS are configured independently. That is, for example, an indicator indicating the RS pattern of DMRS and an indicator indicating the RS pattern of SRS transmitted at once can also be configured so as to be different from each other. When one terminal 200 transmits a DMRS and SRS at once, the RS pattern of DMRS and the RS pattern of SRS can also be configured simultaneously by one indicator. The amount of signaling can be reduced in this case.

Coding/modulation section 102 encodes and modulates configuration information, trigger information and allocation information received from configuration section 101 and outputs the obtained modulation signal to transmission processing section 104. At this time, since the indicator indicating the RS pattern of DMRS and the indicator indicating the RS pattern of SRS are transmitted using different PDCCHs, these indicators are coded independently. Furthermore, the trigger information may be indicated by an instruction (that is, constellation) which is unlikely to be used all the time, or a trigger bit may be newly added and the trigger information may be indicated using this bit.

Coding/modulation section 103 encodes and modulates the inputted data signal and outputs the obtained modulation signal to transmission processing section 104.

Transmission processing section 104 maps the modulation signals received from coding/modulation section 102 and coding/modulation section 103 to resources indicated by the downlink resource allocation information received from configuration section 101 and thereby forms a transmission signal. When the transmission signal is an OFDM signal, the OFDM signal is formed by mapping the modulation signal to a resource indicated by the downlink resource allocation information received from configuration section 101, applying inverse fast Fourier transform (IFFT) processing thereto to transform the signal to a time waveform and adding a CP (cyclic prefix) thereto.

Transmitting section 105 applies transmission radio processing (up-conversion, digital/analog (D/A) conversion or the like) to the transmission signal received from transmission processing section 104 and transmits the transmission signal via antenna 106.

Receiving section 107 applies reception radio processing (down-conversion, analog/digital (A/D) conversion or the like) to a radio signal received via antenna 106 and outputs the received signal obtained to reception processing section 108.

Reception processing section 108 specifies resources to which an uplink data signal and ACK/NACK information are mapped based on the uplink resource allocation information received from configuration section 101 and extracts signal components mapped to the specified resources from the received signal.

Furthermore, reception processing section 108 specifies a resource to which an SRS is mapped based on the configuration information and trigger information received from configuration section 101.

More specifically, reception processing section 108 specifies a time-frequency resource to which the SRS is mapped based on the "time-frequency resource configuration information" and trigger information. Furthermore, reception processing section 108 specifies a code resource to which the SRS is mapped (that is, the cyclic shift value of the cyclic shift sequence used for SRS transmission and OCC) based on the "code resource configuration information" and "RS pattern table." Details of the "RS pattern table" will be described, hereinafter.

Furthermore, reception processing section 108 specifies a code resource to which DMRS is mapped (that is, the cyclic shift amount of the cyclic shift sequence used for DMRS transmission and OCC) based on the uplink resource allocation information and trigger information received from configuration section 101.

Here, a DMRS and SRS assigned to the same time-frequency resource are code-multiplexed by a CS sequence and OCC. Therefore, code resources to which a DMRS and SRS are mapped are specified based on the "time-frequency resource configuration information," uplink resource allocation information, trigger information, and "RS pattern table."

Reception processing section 108 then extracts, from the received signal, signal components mapped to the resources specified as resources to which a DMRS and SRS are mapped. Thus, DMRS and SRS are demultiplexed.

When the received signal is a spatially multiplexed signal (that is, transmitted with a plurality of codewords (CWs)), reception processing section 108 demultiplexes the received signal for each CW. On the other hand, when the received signal is an OFDM signal, reception processing section 108 applies IDFT (inverse discrete Fourier transform) processing to the extracted signal component to transform the signal component into a time domain signal.

The uplink data signal and ACK/NACK information extracted by reception processing section 108 in this way are outputted to data receiving section 109, and SRS is outputted to SRS receiving section 110. A DMRS is used for equalization processing or the like on an uplink data signal in data receiving section 109.

Data receiving section 109 decodes the signal received from reception processing section 108. The uplink data and ACK/NACK information are obtained in this way.

SRS receiving section 110 measures receiving quality of each frequency resource unit based on the SRS received from reception processing section 108 and outputs receiving quality information.

When a traffic condition does not change in the cell of base station 100 or when average receiving quality is desired to be measured, the configuration information (candidate resource configuration information) and trigger information are preferably reported with higher layer information having a long reporting interval, from the viewpoint of signaling. Furthermore, the indication amount can be further reduced by indicating part or whole of the configuration information and trigger information as broadcast information. However, when the configuration information and trigger information need to be changed more dynamically in accordance with a traffic condition or the like, it is preferable to indicate part or whole of the configuration information and trigger information using a PDCCH having a short indication interval.

[Configuration of Terminal 200]

Figure 10:
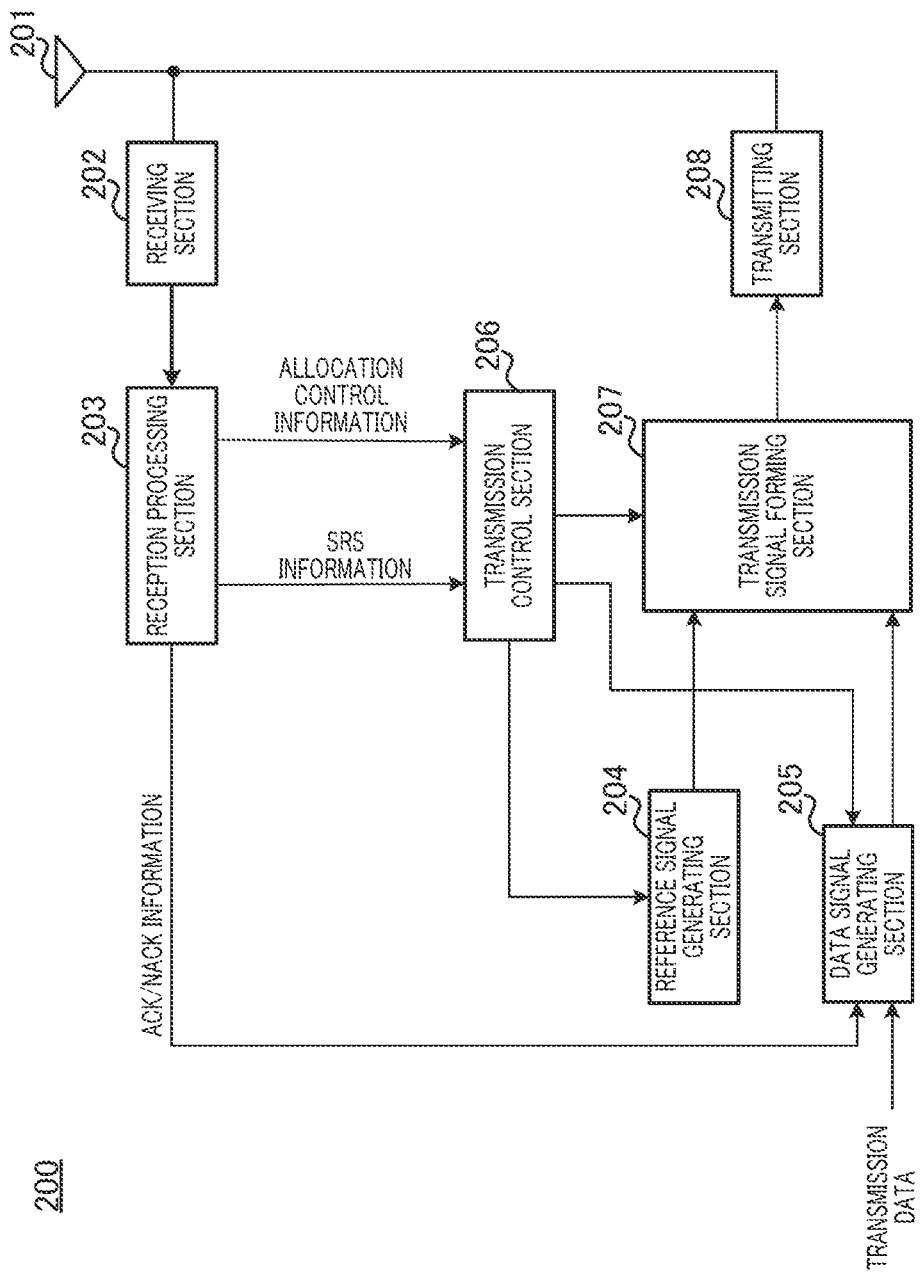
FIG. 10 is a block diagram illustrating a configuration of the terminal according to Embodiment 1 of the present invention.

FIG. 10 is a block diagram illustrating a configuration of terminal 200 according to Embodiment 1 of the present invention. Here, terminal 200 is an LTE-A terminal.

In FIG. 10, terminal 200 includes antenna 201, receiving section 202, reception processing section 203, reference signal generating section 204, data signal generating section 205, transmission control section 206, transmission signal forming section 207, and transmitting section 208.

Receiving section 202 applies reception radio processing (down-conversion, analog/digital (A/D) conversion or the like) to a radio signal received via antenna 201 and outputs the received signal obtained to reception processing section 203.

Reception processing section 203 extracts configuration information, allocation information, trigger information and a data signal included in the received signal. Here, when the configuration information of a DMRS and SRS is transmitted using different PDCCHs, different parameters may be used for the DMRS and SRS.

Reception processing section 203 outputs the configuration information, allocation information and trigger information to transmission control section 206. Furthermore, reception processing section 203 performs error detection processing on the extracted data signal and outputs ACK/NACK information corresponding to the error detection result to data signal generating section 205.

Transmission control section 206 specifies a time-frequency resource to which terminal 200 maps an SRS. More specifically, transmission control section 206 specifies a time-frequency resource (hereinafter, may be referred to as "SRS mapping resource") based on the configuration information (time-frequency resource configuration information) and trigger information received from reception processing section 203. Transmission control section 206 outputs information on the SRS mapping resource to transmission signal forming section 207. Furthermore, transmission control section 206 outputs an SRS generation instruction and an indicator indicating an RS pattern of SRS to reference signal generating section 204.

Furthermore, transmission control section 206 specifies time-frequency resources to which terminal 200 maps a data signal and a DMRS. More specifically, transmission control section 206 specifies a time-frequency resource (hereinafter, may be referred to as "data mapping resource" or "DMRS mapping resource") based on allocation information received from reception processing section 203. Transmission control section 206 outputs information on the data mapping resource and DMRS mapping resource to transmission signal forming section 207. Furthermore, transmission control section 206 outputs a DMRS generation instruction and an indicator indicating an RS pattern of DMRS to reference signal generating section 204. Furthermore, transmission control section 206 outputs MCS information included in the allocation information to data signal generating section 205.

Here, transmission control section 206 determines whether to output a DMRS generation instruction or SRS generation instruction (that is, whether to cause reference signal generating section 204 to generate DMRS or generate SRS) to reference signal generating section 204 based on the trigger information.

Upon receiving the SRS generation instruction from transmission control section 206, reference signal generating section 204 generates an SRS based on the indicator indicating the RS pattern of RS received from transmission control section 206 and the "RS pattern table." Details of the "RS pattern table" will be described, hereinafter.

Furthermore, reference signal generating section 204 generates a DMRS based on the indicator indicating the RS pattern of the DMRS received from transmission control section 206 and the "RS pattern table."

The pieces of configuration information (time-frequency resource configuration information) of DMRS and SRS, and the trigger information may be reported using two different PDCCHs. At this time, the trigger information of one PDCCH may indicate an instruction for generating a DMRS and the trigger information of the other PDCCH may indicate an instruction for generating an SRS. In this case, reference signal generating section 204 generates a DMRS and SRS.

Data signal generating section 205 receives ACK/NACK information and transmission data as input, encodes and modulates the ACK/NACK information and transmission data based on the MCS information received from transmission control section 206 and thereby generates a data signal. In the case of non-MIMO transmission, a data signal is generated with one codeword (CW), and in the case of MIMO transmission, a data signal is generated with two codewords. When the received signal is an OFDM signal, data signal generating section 205 also performs CP removal processing and FFT processing.

Transmission signal forming section 207 maps the SRS received from reference signal generating section 204 to an SRS mapping resource. Furthermore, transmission signal forming section 207 maps the DMRS received from reference signal generating section 204 and the data signal received from data signal generating section 205 to a data mapping resource and a DMRS mapping resource respectively. A transmission signal is formed in this way.

The SRS received from reference signal generating section 204 may also be mapped to the DMRS mapping resource. More specifically, there may be a case where an SRS and DMRS are code-multiplexed with the same DMRS mapping resource.

Transmitting section 208 applies transmission radio processing (up-conversion, digital/analog (D/A) conversion or the like) to the transmission signal formed in transmission signal forming section 207 and transmits the transmission signal via antenna 201.

[Operations of Base Station 100 and Terminal 200]

Operations of base station 100 and terminal 200 configured as described above will be described. Here, a description will be given of candidate code resource configuration processing on configuration-target terminal 200, SRS or DMRS transmission processing using a candidate code resource by terminal 200 and reception processing by base station 100 on SRS or DMRS transmitted from terminal 200. Furthermore, in particular, a case will be described where one of first terminal 200 and second terminal 200 transmits an SRS and the other transmits a DMRS with the same time-frequency resource (that is, a case where SRS and DMRS transmitted from two different terminals 200 are code-multiplexed). Furthermore, especially, a description will be given of a case where an SRS or DMRS is transmitted using three or more antenna ports.

<Candidate Code Resource Configuration Processing on Configuration-Target Terminal 200>

Configuration section 101 generates candidate code resource configuration information for configuring a candidate code resource of configuration-target terminal 200.

Here, RS pattern identification information (3-bit indicator) is used particularly for code resource configuration information.

Furthermore, when instructing terminal 200 to transmit an SRS, configuration section 101 generates trigger information. Configuration-target terminal 200 determines whether to transmit an SRS or transmit a DMRS based on this trigger information.

The candidate code resource configuration information and trigger information generated in this way are transmitted to terminal 200 via a PDCCH.

<Transmission Processing by Terminal 200 on SRS or DMRS Using Candidate Code Resource>

Transmission control section 206 determines whether to transmit an SRS or transmit a DMRS based on trigger information received from reception processing section 203.

When transmission control section 206 determines to transmit a DMRS, reference signal generating section 204 generates a DMRS based on the candidate code resource configuration information and the RS pattern table of DMRS.

On the other hand, when transmission control section 206 determines to transmit an SRS, reference signal generating section 204 generates an SRS based on the candidate code resource configuration information and the RS pattern table of SRS.

Transmission signal forming section 207 maps the DMRS or SRS generated in reference signal generating section 204 to a time-frequency resource and transmits the mapped signal to base station 100.

Here, a relationship between the RS pattern table of DMRS and the RS pattern table of SRS will be described. FIGS. 11A and B illustrate the RS pattern table of DMRS and the RS pattern table of SRS, respectively. Particularly, FIG. 11A shows the RS pattern table of DMRS and FIG. 11B shows the RS pattern table of SRS.

In FIGS. 11A and B, attention is focused on a given indicator (that is, an RS pattern candidate). For example, when attention is focused on indicator "000," while CS pattern candidates in the RS pattern table of DMRS are "0, 6, 3, 9," CS pattern candidates in the RS pattern table of SRS are "3, 9, 6, 0." That is, CS pattern candidates in the RS pattern table of SRS are obtained by adding a CS sequence length×¼ (that is, a symbol length×¼) to the cyclic shift value for each element of CS pattern candidates in the RS pattern table of DMRS, that is, adding 3 to the cyclic shift number. This relationship holds true for a given indicator.

Furthermore, for example, when attention is focused on indicator "000," while OCC pattern candidates in the RS pattern table of DMRS are "w1, w1, w2, w2," CS pattern candidates in the RS pattern table of SRS are "w2, w2, w1, w1." That is, CS pattern candidates in the RS pattern table of SRS are obtained by inverting elements of the OCC pattern candidates in the RS pattern table of DMRS into an inverted state. This relationship holds true for a given indicator.

When first terminal 200 transmits a DMRS and second terminal 200 transmits an SRS with the same time-frequency resource, first terminal 200 uses the RS pattern table of DMRS and second terminal 200 uses the RS pattern table of SRS.

When the RS pattern table of DMRS and the RS pattern table of SRS have such a relationship, the following effects can be obtained.

That is, in the RS pattern table of DMRS and the RS pattern table of SRS, RS pattern candidates of DMRS differ from RS pattern candidates of SRS with respect to a given common indicator and elements of OCC pattern candidates are also inverted. For this reason, it is possible to prevent a reduction in the degree of freedom regarding assignment of a DMRS and SRS and also to reduce inter-sequence interference. For example, in the RS pattern tables in FIGS. 11A and B, when attention is focused on indicator "011," even when CS pattern candidates of the RS pattern candidates of DMRS are "4, 10" and OCC pattern candidates are "w1, w1," the CS pattern candidates of the RS pattern candidates of SRS can be "7, 1" and the OCC pattern candidates can be "w2, w2."

<Reception Processing by Base Station 100 on DMRS and SRS Transmitted from Terminal 200>

Reception processing section 108 determines whether to receive an SRS or receive a DMRS or receive both an SRS and DMRS based on the trigger information received from configuration section 101.

When receiving a DMRS, reception processing section 108 specifies a resource to which the DMRS is mapped based on the candidate code resource configuration information and the RS pattern table of DMRS.

On the other hand, when receiving an SRS, reception processing section 108 specifies a resource to which the SRS is mapped based on the candidate code resource configuration information and the RS pattern table of SRS.

Reception processing section 108 extracts signal components mapped to the resources specified as the resources to which a DMRS and SRS are mapped from the received signal. The DMRS and SRS are demultiplexed in this way.

As described above, according to the present embodiment, terminal 200 transmits to base station 100 at least one of a DMRS used to demodulate received data and an SRS used to measure receiving quality in base station 100. In terminal 200, reference signal generating section 204 generates a DMRS and SRS based on the reference signal patterns used for DMRS and SRS configured by base station 100. Transmitting section 208 transmits at least one of the DMRS and SRS generated.

The reference signal pattern is formed of a first pattern (that is, a CS sequence pattern) and a second pattern (that is, an OCC pattern). The first pattern is formed of pieces of identification information of a plurality of antenna ports and a cyclic shift value given to a cyclic shift sequence corresponding to each piece of identification information. The second pattern is formed of pieces of identification information of a plurality of antenna ports and identification information of a first Walsh sequence or a second Walsh sequence corresponding to each piece of identification information.

The reference signal pattern of DMRS and the reference signal pattern of SRS have a relationship in which the reference signal pattern of SRS is obtained by adding a length corresponding to a sequence length of a cyclic shift sequence×¼ to the cyclic shift value which is a component of the first pattern in the reference signal pattern of DMRS and inverting identification information of the first Walsh sequence or second Walsh sequence which is a component of the second pattern.

By so doing, the RS pattern of DMRS differs from the RS pattern of SRS with respect to a common indicator, and elements of OCC pattern candidates are also inverted, and it is thereby possible to prevent a reduction in the degree of freedom regarding assignment of DMRS and SRS, and also to reduce inter-sequence interference.

In the above description, the length to be added to the cyclic shift value which is a component of the first pattern in the reference signal pattern of DMRS is assumed to be the sequence length of the cyclic shift sequence×¼, but the present invention is not limited to this and the length to be added to the cyclic shift value may be the sequence length of the cyclic shift sequence×¾ and an effect equivalent to the above-described one can be obtained in that case as well (see FIG. 12).

The above description has been given on the assumption that an SRS and DMRS are each transmitted using two antenna ports. However, without being limited to this, even when one of a DMRS and SRS is transmitted using one antenna port and the other is transmitted using two antenna ports, the effects similar to those obtained when an SRS and DMRS are each transmitted using two antenna ports can be obtained.

A case has been described above where an SRS and DMRS transmitted from two different terminals 200 are code-multiplexed. However, without being limited to this, operation is possible even when an SRS and DMRS are code-multiplexed and transmitted from one terminal 200. In this case, trigger information for instructing transmission of an SRS and trigger information for instructing transmission of a DMRS are transmitted to one terminal 200 via two PDCCHs. One terminal 200 that has received two pieces of trigger information generates SRS and DMRS based on one piece of candidate code resource configuration information and code-multiplexes the generated SRS and DMRS, and transmits the code-multiplexed signal. The operation of base station 100 that performs reception processing on the SRS and DMRS code-multiplexed and transmitted in one terminal is similar to that described above.

Furthermore, in the case where the length added to the cyclic shift value which is a component of the first pattern in the reference signal pattern of DMRS is set to the sequence length of the cyclic shift sequence×¾, inter-sequence interference can be further reduced. This is because when a DMRS is transmitted using three antenna ports and an SRS is transmitted using one antenna port, the deviation between w1 and w2 can be reduced. For example, even when CS pattern candidates of RS pattern candidates of DMRS are "0, 6, 3" and OCC pattern candidates are "w1, w1, w2," a CS pattern candidate of RS pattern candidates of SRS can be "9" and an OCC pattern candidate can be "w2."

Furthermore, as described above, it is possible to determine DMRS transmission or SRS transmission using the trigger information of SRS reported by PDCCH, and it is thereby possible to switch between the RS pattern table of DMRS and the RS pattern table of SRS without extra indication.

Moreover, since the reference signal pattern of DMRS and the reference signal pattern of SRS have the above relationship, the difference between the cyclic shift value which is a component of the reference signal pattern of DMRS and the cyclic shift value which is a component of the reference signal pattern of SRS can be set to 3 even when a DMRS and SRS are transmitted using four antenna ports (see FIG. 13). More specifically, it is possible to assign the CS pattern candidates of the RS pattern candidates of DMRS to "0, 6, 3, 9," the OCC pattern candidates to "w1, w1, w2, w2" and the CS pattern candidates of the RS pattern candidates of SRS to "9, 3, 0, 6", and the OCC pattern candidates to "w1, w1, w2, w2." Such assignment is suitable for an environment in which high orthogonality can be maintained by OCC (e.g., environment having a moderate time variation) and can reduce interference between DMRS and SRS sequences to a low level. On the other hand, in an environment in which high orthogonality cannot be maintained by OCC (e.g., environment having a steep time variation), orthogonality by OCC can be secured by assigning the CS pattern candidates of the RS pattern candidates of DMRS to "4, 10, 7, 1", the OCC pattern candidates to "w1, w1, w1, w1," the CS pattern candidates of the RS pattern candidates of SRS to "5, 11, 8, 2", and the OCC pattern candidates to "w2, w2, w2, w2."

In the above description, the relationship between the reference signal pattern of DMRS and the reference signal pattern of SRS is expressed as a relationship in which the reference signal pattern of SRS is obtained by adding a length corresponding to the sequence length of the cyclic shift sequence×¼ to the cyclic shift amount which is a component of the first pattern in the reference signal pattern of DMRS and inverting identification information of the first Walsh sequence or second Walsh sequence which is a component of the second pattern, but the relationship is not limited to this.

For example, the following expression can be used. That is, the reference signal pattern of DMRS and the reference signal pattern of SRS have a relationship in which the reference signal pattern of SRS is obtained by adding a length corresponding to the sequence length of the cyclic shift sequence× (¼+½) or ×(¾+½) to the cyclic shift value which is a component of the first pattern in the reference signal pattern of DMRS. FIG. 14 shows the RS pattern table of SRS when the length added to the cyclic shift value which is a component of the first pattern is the sequence length of the cyclic shift sequence×(¼+½). On the other hand, FIG. 15 shows the RS pattern table of SRS when the length added to the cyclic shift value which is a component of the first pattern is the sequence length of the cyclic shift sequence×(¾+½). More specifically, FIG. 14 and FIG. 15 show a result of adding 9 (=3+6) or 15 (=9+6) to the cyclic shift number which is a component of the first pattern in the reference signal pattern of DMRS. Adding 15 is equivalent to adding 3 from mod 12 in consideration of the fact that there are 12 cyclic shift numbers (0 to 11).

In the Rel.10 standard, the amount of CS is determined by equation 1.

(Equation 1)

$$n_{cs,\lambda} = (n_{DMRS}^{(1)} + n_{DMRS,\lambda}^{(2)} + n_{PN}(n_s)) \bmod 12 \quad [1]$$

where, $n_{DMRS}^{(1)}$ is a cyclic shift value indicated by a higher layer for each cell, $n_{DMRS,\lambda}^{(2)}$ is a cyclic shift value indicated by PDCCH for each terminal 200, and $n_{PN}(n_s)$ is a randomized coefficient of the cyclic shift value which is dependent on a cell ID. The CS number defined in each table above is substituted as $n_{DMRS,\lambda}^{(2)}$.

Therefore, although the RS pattern table of DMRS and the RS pattern table of SRS are provided separately in the above description, the present invention is not limited to this, and the RS pattern of DMRS and the RS pattern of SRS may be calculated using calculation equations. That is, the RS pattern of DMRS is obtained by converting equation 1 into equation 2 and assuming X=0 in equation 2. Furthermore, the RS pattern of SRS is obtained by assuming X=3 or X=9 in equation 2.

(Equation 2)

$$n_{cs,\lambda} = (n_{DMRS}^{(1)} + n_{DMRS,\lambda}^{(2)} + n_{PN}(n_s) + X) \bmod 12 \quad [2]$$

Embodiment 2

Embodiment 2 relates to a variation of the RS pattern table.

FIGS. 16A and B illustrate an RS pattern table of DMRS and an RS pattern table of SRS according to Embodiment 2.

In FIGS. 16A and B, when attention is focused on a given indicator, CS pattern candidates of the RS pattern table of SRS are obtained by adding 1 or −1 to the elements of CS pattern candidates in the RS pattern table of DMRS. This relationship holds true for a given indicator.

When attention is focused on a given indicator in FIGS. 16A and B, CS pattern candidates in the RS pattern table of SRS are obtained by inverting elements of the OCC pattern candidates in the RS pattern table of DMRS into an inverted state. This relationship holds true for a given indicator.

The following effects can be obtained when the RS pattern table of DMRS and the RS pattern table of SRS have such a relationship.

That is, in the RS pattern table of DMRS and the RS pattern table of SRS, RS pattern candidates of DMRS are different from RS pattern candidates of SRS and the elements of the OCC pattern candidates are also inverted with respect to a given common indicator. For this reason, it is possible to prevent a reduction in the degree of freedom regarding assignment of DMRS and SRS, and also reduce inter-sequence interference.

Adopting the relationship shown in FIGS. 16A and B for the RS pattern table of DMRS and the RS pattern table of SRS can solve the above-described second problem. That is, inter-sequence interference can be reduced even when a DMRS and SRS are each transmitted using four antenna ports.

When the sum of the number of antenna ports used for DMRS transmission and the number of antenna ports used for SRS transmission is five or greater (e.g., when the number of DMRS antenna ports is three and the number of SRS antenna ports is two or the like), assuming that the RS pattern table of DMRS is as shown in FIG. 2, the cyclic shift amount which is a component of the RS pattern of DMRS may be positioned adjacent to the cyclic shift value which is a component of the RS pattern of SRS. For example, when the CS sequence pattern of DMRS is "0, 6, 3," irrespective of whether the CS sequence pattern of SRS is "1, 7" or "2, 8," the CS sequence pattern of DMRS and the CS sequence pattern of SRS include cyclic shift values whose difference is 1. However, as described above, since in the RS pattern table of DMRS and the RS pattern table of SRS, the RS pattern candidates of DMRS are different from the RS pattern candidates of SRS regarding a given common indicator, and elements of the OCC pattern candidates are inverted, inter-sequence interference can be reduced even when the total number of antenna ports is five or more.

On the other hand, in the case where the sum of the number of antenna ports used for DMRS transmission and the number of antenna ports used for SRS transmission is four or less (e.g., when the number of antenna ports used for DMRS transmission is one and the number of antenna ports used for SRS transmission is one) and a cyclic shift value whose difference in the cyclic shift number is 1 is used, inter-sequence interference can be reduced in the same way as in the case where the total number is five.

Furthermore, when adding one to each element of a CS pattern candidate in the RS pattern table of DMRS causes each element to become a CS pattern candidate in the RS pattern table of SRS, the cyclic shift number of SRS is greater by one than the cyclic shift number of DMRS. No cyclic shift number is used which is greater by one than the cyclic shift number of SRS. This allows the delay spread of SRS transmission to become wider. That is, base station 100 can also receive a delay wave that arrives within a period corresponding to the cyclic shift sequence corresponding to a cyclic shift number greater by one than the cyclic shift number of RS. In contrast, when adding −1 to each element of a CS pattern candidate in the RS pattern table of DMRS causes each element to become a CS pattern candidate in the RS pattern table of SRS, the cyclic shift number of DMRS becomes greater by one than the cyclic shift number of SRS. No cyclic shift number is used which is greater by one than the cyclic shift number of DMRS. This allows the delay spread of DMRS transmission to become wider. Generally, higher accuracy channel estimation is required for DMRS than SRS. For this reason, it is preferable to adopt a relationship in which adding −1 to each element of the CS pattern candidates in the RS pattern table of DMRS causes each element to become a CS pattern candidate in the RS pattern table of SRS. However, when high accuracy channel estimation is required for SRS, it is preferable to adopt a relationship in which adding −1 to each element of the CS pattern candidates in the RS pattern table of DMRS causes each element to become a CS pattern candidate in the RS pattern table of SRS.

As described above, according to the present embodiment, the reference signal pattern of DMRS and the reference signal pattern of SRS have a relationship in which the reference signal pattern of SRS is obtained by adding a length corresponding to a sequence length of a cyclic shift sequence×($1/12$) or a sequence length of a cyclic shift sequence×(−$1/12$) to the cyclic shift value which is a component of the first pattern in the reference signal pattern of DMRS and inverting identification information of a first Walsh sequence or a second Walsh sequence which is a component of the second pattern.

As a result, the RS pattern of DMRS differs from the RS pattern of SRS with respect to a common indicator, and elements of OCC pattern candidates are also inverted, and it is thereby possible to prevent a reduction in the degree of freedom regarding assignment of a DMRS and SRS and also to reduce inter-sequence interference.

In the above description, the relationship between the reference signal pattern of DMRS and the reference signal pattern of SRS is expressed as a relationship in which the reference signal pattern of SRS is obtained by adding a length corresponding to a sequence length of a cyclic shift sequence×($1/12$) or a sequence length of a cyclic shift sequence×(−$1/12$) to the cyclic shift value which is a component of the first pattern in the reference signal pattern of DMRS and inverting identification information of the first Walsh sequence or the second Walsh sequence which is a component of the second pattern, but the relationship is not limited to this.

For example, the following expression may also be used. That is, the reference signal pattern of DMRS and the reference signal pattern of SRS have a relationship in which the reference signal pattern of SRS is obtained by adding a length corresponding to the sequence length of the cyclic shift sequence×($1/12$+$6/12$) or the sequence length of the cyclic shift sequence×(−$1/12$+$6/12$) to the cyclic shift value which is a component of the first pattern in the reference signal pattern of DMRS. FIG. 17 shows the RS pattern table of SRS when the length added to the cyclic shift value which is a component of the first pattern is the sequence length of the cyclic shift sequence×($1/12$+$6/12$). More specifically, FIGS. 16A and B, and FIG. 17 show that 7 (=1+6) or 5 (=−1+6) is added to the cyclic shift number which is a component of the first pattern in the reference signal pattern of DMRS.

In the above description, the RS pattern table of DMRS and the RS pattern table of SRS have been provided separately, but the present invention is not limited to this, and the RS pattern of DMRS and the RS pattern of SRS may also be obtained by a calculation equation. That is, the RS pattern of DMRS can be obtained by assuming X=0 in equation 1. In addition, the RS pattern of SRS can be obtained by assuming X=7 or X=5 in equation 1.

Other Embodiments (1) The RS pattern table described in Embodiment 1 and the RS pattern table described in Embodiment 2 may be switched according to the number of antenna ports. This switching processing is performed in reception processing section 108 and reference signal generating section 204.

More specifically, when a DMRS and SRS are each transmitted using two antenna ports, the RS pattern table in FIGS. 11A and B, FIG. 12, FIG. 14 or FIG. 15 may be used, and when a DMRS and SRS are each transmitted using four antenna ports, the RS pattern table in FIGS. 16A and B or FIG. 17 may be used. Thus, an optimum RS pattern table can be used for transmission of a DMRS and SRS each using two antenna ports and for transmission of a DMRS and SRS each using four antenna ports.

Furthermore, instead of switching between the RS pattern tables, the value of X to be substituted may be switched using equation 1 and the value of X.

(2) A case has been described in each embodiment above where the two types of reference signals are DMRS and SRS, but the present invention is not limited to this. The present invention is applicable to two types of reference signals or two types of pilot signals.

(3) Each embodiment above has been described on the assumption that the RS pattern of DMRS and the RS pattern of SRS are different in both the CS sequence pattern and the OCC pattern. However, the present invention is not limited to the embodiments. Switching processing may also be performed by indicating whether or not to invert elements of the OCC pattern candidates of SRS through indication of a higher layer. Furthermore, switching processing may also be performed by indicating an offset value (e.g., +3) through a higher layer to thereby indicate whether or not to add the offset value to elements of the CS sequence pattern candidates of SRS.

(4) In each embodiment above, OCC (w1 or w2) applicable to a DMRS for the first antenna port and OCC (w1 or w2) applicable to an SRS for the first antenna port can be selected by appropriately selecting a 3-bit indicator. For this reason, for example, even when both first terminal 200 and second terminal 200 transmit an SRS, w1 can be assigned to first terminal 200 and w2 can be assigned to second terminal 200. Inter-sequence interference between SRSs can also be reduced in this way.

(5) Different identification numbers of antenna ports may be used for a DMRS and SRS. For example, it is assumed that the first antenna port (antenna port #0) is used first for DMRS, whereas the third antenna port which corresponds to the identification number of the antenna port of DMRS plus an offset (+2) is used first for SRS. The amount of offset is not limited to the example described above.

(6) In each embodiment above, the term "antenna port" refers to a logical antenna including a single or a plurality of physical antennas. That is, the antenna port is not limited to a single physical antenna, but may be to an antenna array formed of a plurality of antennas.

(7) In each embodiment above, although the cyclic shift value of a cyclic shift sequence has been described only as the sequence length×Y ($1/4$, $3/4$ or the like), the sequence length may be replaced by the cyclic shift number such as 12×Y ($1/4$, $3/4$ or the like).

For example, in 3GPP LTE, the number of physical antennas to be included in the antenna port is not defined, but the definition is provided as the minimum unit allowing the base station to transmit different reference signals.

In addition, the antenna port may be defined as a minimum unit for multiplying a weighting of the pre-coding vector.

(8) In each embodiment above, the present invention is configured with hardware by way of example, but the invention may also be implemented by software in cooperation with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable after fabrication of LSI, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-098353, filed on Apr. 26, 2011, including the specification, drawings and abstract, is incorporated herein by reference in its entirety.

INDUSTRIAL APPLICABILITY

The transmitting apparatus, receiving apparatus, transmission method, and reception method of the present invention are useful in that the apparatuses and methods can prevent a reduction in the degree of freedom regarding assignment of a demodulation reference signal and a receiving quality reference signal even when the demodulation reference signal and the receiving quality reference signal are transmitted using the same time-frequency resource.

REFERENCE SIGNS LIST

100 Base station
101 Configuration section
102, 103 Coding/modulation section
104 Transmission processing section
105, 208 Transmitting section
106, 201 Antenna
107, 202 Receiving section
108, 203 Reception processing section
109 Data receiving section
110 SRS receiving section
200 Terminal
204 Reference signal generating section
205 Data signal generating section
206 Transmission control section
207 Transmission signal forming section

The invention claimed is:

1. A transmitting apparatus configured to transmit, to a receiving apparatus, using a plurality of antenna ports, at least one of a first reference signal used in the receiving apparatus to demodulate received data and a second reference signal used in the receiving apparatus to measure receiving quality, the transmitting apparatus comprising:

a generating section that generates at least one of the first reference signal and the second reference signal based on identification information of a reference signal pattern used for the first reference signal and the second reference signal; and a transmitting section that transmits at least one of the generated first reference signal and second reference signal, wherein:

the reference signal pattern includes a first pattern and a second pattern;

the first pattern includes pieces of identification information of the plurality of antenna ports and cyclic shift values, which are given to a cyclic shift sequence, respectively corresponding to the pieces of identification information of the plurality of antenna ports;

the second pattern includes the pieces of identification information of the plurality of antenna ports and identification information of a first Walsh sequence or a second Walsh sequence corresponding to each of the pieces of identification information of the plurality of antenna ports; and the reference signal pattern of the first reference signal and the reference signal pattern of the second reference signal have a first relationship in which the reference signal pattern of the second reference signal is obtained by adding a length corresponding to a sequence length of the cyclic shift sequence$\times 1/4$ or $3/4$ to the cyclic shift values and inverting the identification information of the first Walsh sequence or the second Walsh sequence, the cyclic shift values being a component of the first pattern in the reference signal pattern of the first reference signal, the identification information of the first Walsh sequence or the second Walsh sequence being a component of the second pattern in the reference signal pattern of the first reference signal.

2. The transmitting apparatus according to claim 1, wherein the generating section generates one of the first reference signal and the second reference signal based on instruction information for issuing an instruction to transmit one of the first reference signal and the second reference signal.

3. The transmitting apparatus according to claim 1, wherein the generating section switches, based on the number of antenna ports through which each of the first reference signal and the second reference signal is transmitted, between the first relationship and a second relationship in which a reference signal pattern of sounding reference signals (SRS) is obtained by adding a length corresponding to a sequence length of the cyclic shift sequence$\times 1/12$ or $1/12 \times(-1)$ to the cyclic shift values and inverting identification information of the first Walsh sequence or the second Walsh sequence, the second relationship being between the reference signal pattern of the first reference signal and the reference signal pattern of the second reference signal, the cyclic shift values being a component of the first pattern in the reference signal pattern of the first reference signal, the identification information of the first Walsh sequence or the second Walsh sequence being a component of the second pattern in the reference signal pattern of the first reference signal.

4. A receiving apparatus configured to receive a first reference signal used to demodulate received data and a second reference signal used to measure receiving quality, using a plurality of antenna ports, the first and second reference signals being transmitted from a plurality of transmitting apparatuses, the receiving apparatus comprising:

a configuration section that configures a reference signal pattern used for the first reference signal and the second reference signal; and a reception processing section that extracts at least one of the first reference signal and the second reference signal based on identification information of the configured reference signal pattern, wherein:
the reference signal pattern includes a first pattern and a second pattern;
the first pattern includes pieces of identification information of the plurality of antenna ports and cyclic shift values, which are given to a cyclic shift sequence, respectively corresponding to the pieces of identification information of the plurality of antenna ports;
the second pattern includes the pieces of identification information of the plurality of antenna ports and identification information of a first Walsh sequence or a second Walsh sequence corresponding to each of the pieces of identification information of the plurality of antenna ports; and
the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift values and inverting the identification information of the first Walsh sequence or the second Walsh sequence, the cyclic shift values being a component of the first pattern in the reference signal pattern of the first reference signal, the identification information of the first Walsh sequence or the second Walsh sequence being a component of the second pattern in the reference signal pattern of the first reference signal.

5. The receiving apparatus according to claim 4, wherein the configuration section generates instruction information for issuing an instruction to transmit one of the first reference signal and the second reference signal, the instruction being transmitted to the transmitting apparatus.

6. The receiving apparatus according to claim 4, wherein the generating section switches, based on the number of antenna ports through which each of the first reference signal and the second reference signal is transmitted, between the first relationship and a second relationship in which a reference signal pattern of sounding reference signals (SRS) is obtained by adding a length corresponding to a sequence length of the cyclic shift sequence×¹⁄₁₂ or ¹⁄₁₂×(−1) to the cyclic shift values and inverting identification information of the first Walsh sequence or the second Walsh sequence, the second relationship being between the reference signal pattern of the first reference signal and the reference signal pattern of the second reference signal, the cyclic shift values being a component of the first pattern in the reference signal pattern of the first reference signal, the identification information of the first Walsh sequence or the second Walsh sequence being a component of the second pattern in the reference signal pattern of the first reference signal.

7. A transmission method for transmitting, to a receiving apparatus, using a plurality of antenna ports, at least one of a first reference signal used in the receiving apparatus to demodulate received data and a second reference signal used in the receiving apparatus to measure receiving quality, the transmitting method comprising:
generating at least one of the first reference signal and the second reference signal based on identification information of a reference signal pattern used for the first reference signal and the second reference signal; and
transmitting at least one of the generated first reference signal and second reference signal, wherein:
the reference signal pattern includes a first pattern and a second pattern;
the first pattern includes pieces of identification information of the plurality of antenna ports and cyclic shift values, which are given to a cyclic shift sequence, respectively corresponding to the pieces of identification information of the plurality of antenna ports;
the second pattern includes the pieces of identification information of the plurality of antenna ports and identification information of a first Walsh sequence or a second Walsh sequence corresponding to each of the pieces of identification information of the plurality of antenna ports; and
the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift values and inverting the identification information of the first Walsh sequence or the second Walsh sequence, the cyclic shift values being a component of the first pattern in the reference signal pattern of the first reference signal, the identification information of the first Walsh sequence or the second Walsh sequence being a component of the second pattern in the reference signal pattern of the first reference signal.

8. A reception method for receiving, using a plurality of antenna ports, at least one of a first reference signal used to demodulate received data and a second reference signal used to measure receiving quality, the first and second reference signals being transmitted from a plurality of transmitting apparatuses, the reception method comprising:
configuring a reference signal pattern used for the first reference signal and the second reference signal; and
extracting at least one of the first reference signal and the second reference signal based on identification information of the configured reference signal pattern, wherein:
the reference signal pattern includes a first pattern and a second pattern;
the first pattern includes pieces of identification information of the plurality of antenna ports and cyclic shift values, which are given to a cyclic shift sequence, respectively corresponding to the pieces of identification information of the plurality of antenna ports;
the second pattern includes the pieces of identification information of the plurality of antenna ports and identification information of a first Walsh sequence or a second Walsh sequence corresponding to each of the pieces of identification information of the plurality of antenna ports; and
the reference signal pattern of the first reference signal and the reference signal pattern of the second reference signal have a first relationship in which the reference signal pattern of the second reference signal is obtained by adding a length corresponding to a sequence length of the cyclic shift sequence×¼ or ¾ to the cyclic shift values and inverting the identification information of the first Walsh sequence or the second Walsh sequence, the cyclic shift values being a component of the first pattern in the reference signal pattern of the first reference signal, the identification information of the first Walsh sequence or the second Walsh sequence being a component of the second pattern in the reference signal pattern of the first reference signal.

* * * * *